(12) United States Patent
Khaitan et al.

(10) Patent No.: US 9,198,139 B2
(45) Date of Patent: Nov. 24, 2015

(54) METHODS AND APPARATUS FOR DEPLOYMENT AND CONTROL OF BASE STATIONS

(75) Inventors: Varun Khaitan, San Diego, CA (US); Mehmet Yavuz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 728 days.

(21) Appl. No.: 13/526,900

(22) Filed: Jun. 19, 2012

(65) Prior Publication Data

US 2013/0157651 A1 Jun. 20, 2013

Related U.S. Application Data

(60) Provisional application No. 61/499,036, filed on Jun. 20, 2011.

(51) Int. Cl.
*H04W 52/24* (2009.01)
*H04W 52/22* (2009.01)
*H04W 52/34* (2009.01)
*H04W 84/04* (2009.01)

(52) U.S. Cl.
CPC .......... *H04W 52/245* (2013.01); *H04W 52/225* (2013.01); *H04W 52/343* (2013.01); *H04W 84/045* (2013.01)

(58) Field of Classification Search
CPC .................................................... H04W 52/24
USPC .............................. 455/422.1–436
See application file for complete search history.

(56) References Cited

U.S. PATENT DOCUMENTS

| | | | |
|---|---|---|---|
| 7,512,379 B2 | 3/2009 | Nguyen | |
| 7,702,351 B2 | 4/2010 | Soliman | |
| 8,050,629 B2 * | 11/2011 | Foster et al. | 455/63.1 |
| 8,260,206 B2 | 9/2012 | Damnjanovic | |
| 2007/0202913 A1 | 8/2007 | Ban | |
| 2009/0042593 A1 | 2/2009 | Yavuz et al. | |
| 2009/0069043 A1 | 3/2009 | Roh et al. | |
| 2009/0185518 A1 | 7/2009 | Viswanath | |
| 2010/0329132 A1 | 12/2010 | Raghothaman et al. | |
| 2011/0009065 A1 * | 1/2011 | Carter | 455/63.1 |
| 2011/0275361 A1 | 11/2011 | Yavuz et al. | |
| 2011/0319118 A1 | 12/2011 | Yu et al. | |

FOREIGN PATENT DOCUMENTS

| | | |
|---|---|---|
| EP | 1638224 A1 | 3/2006 |
| JP | 2010518668 A | 5/2010 |
| KR | 20090073914 A | 7/2009 |
| WO | 2006089196 A1 | 8/2006 |
| WO | 2008093100 A2 | 8/2008 |
| WO | 2010034358 A1 | 4/2010 |
| WO | WO2011100652 A1 | 8/2011 |

OTHER PUBLICATIONS

International Search Report and Written Opinion—PCT/US2012/043400—ISA/EPO—Sep. 19, 2012.

* cited by examiner

*Primary Examiner* — Michael T Vu

(57) ABSTRACT

Methods and apparatuses are provided for performing power control for a femto node deployed in a wireless network that include adjusting a transmission parameter of the femto node based on one or more signal energy parameters, such as a received signal strength indicator (RSSI). A comparison between the signal energy, a noise floor, and a threshold signal energy can be determined, and a transmission parameter of the femto node is accordingly adjusted based on the comparison.

42 Claims, 12 Drawing Sheets

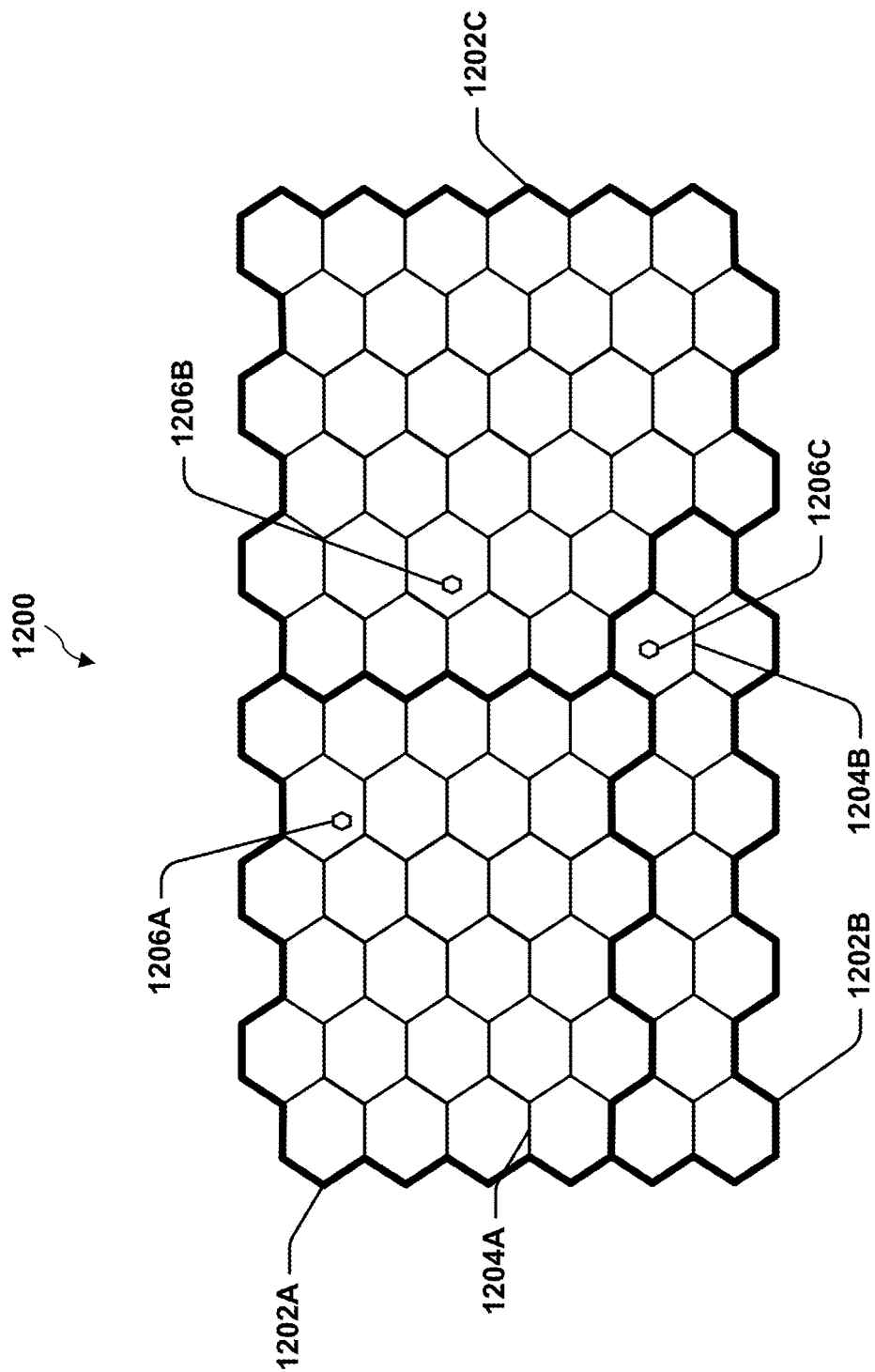

METHODS AND APPARATUS FOR DEPLOYMENT AND CONTROL OF BASE STATIONS

CLAIM OF PRIORITY UNDER 35 U.S.C. §119

The present application for patent claims priority to Provisional Application No. 61/499,036, entitled "AUTONOMOUSLY CONTROLLED WIRELESS ACCESS POINT" filed Jun. 20, 2011, assigned to the assignee hereof and hereby expressly incorporated by reference herein.

BACKGROUND

1. Field

The following description relates generally to wireless network communications, and more particularly to deployment of low power base stations in a wireless network.

2. Background

Wireless communication systems are widely deployed to provide various types of communication content such as, for example, voice, data, and so on. Typical wireless communication systems may be multiple-access systems capable of supporting communication with multiple users by sharing available system resources (e.g., bandwidth, transmit power, . . . ). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP) (e.g., 3GPP LTE (Long Term Evolution)/LTE-Advanced), ultra mobile broadband (UMB), evolution data optimized (EV-DO), etc.

Generally, wireless multiple-access communication systems may simultaneously support communication for multiple mobile devices. Each mobile device may communicate with one or more base stations via transmissions on forward and reverse links. The forward link (or downlink) refers to the communication link from base stations to mobile devices, and the reverse link (or uplink) refers to the communication link from mobile devices to base stations. Further, communications between mobile devices and base stations may be established via single-input single-output (SISO) systems, multiple-input single-output (MISO) systems, multiple-input multiple-output (MIMO) systems, and so forth.

To supplement conventional base stations, additional restricted base stations can be deployed to provide more robust wireless coverage to mobile devices. For example, wireless relay stations and low power base stations (e.g., which can be commonly referred to as Home NodeBs or Home eNBs, collectively referred to as H(e)NBs, femto nodes, pico nodes, etc.) can be deployed for incremental capacity growth, richer user experience, in-building or other specific geographic coverage, and/or the like. Such low power base stations can be connected to the Internet via broadband connection (e.g., digital subscriber line (DSL) router, cable or other modem, etc.), which can provide the backhaul link to the mobile operator's network. Thus, for example, the low power base stations can be deployed in user homes to provide mobile network access to one or more devices via the broadband connection. Because deployment of such base stations is unplanned, low power base stations can interfere with one another where multiple stations are deployed within a close vicinity of one another.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, the present disclosure describes various aspects in connection with calibrating transmit power of one or more low power base stations in a wireless network. For example, transmit power for a given base station can be configured based on signal energy measurements performed by the base station. A transmit power can be computed for a base station based on comparing such metrics to a threshold, a noise floor, etc., which can be tuned to provide coverage in certain areas, achieve a network performance metric, mitigate interference to neighboring base stations, etc. In addition, a centralized entity can compute the transmit powers, for example.

According to an aspect, a method for performing power control for a femto node deployed in a wireless network is provided. The method includes measuring a received signal strength indicator (RSSI) at a femto node, determining a comparison between the RSSI, a noise floor, and a threshold RSSI, and adjusting a transmission parameter of the femto node based on the comparison.

In another aspect, an apparatus for performing power control for a femto node deployed in a wireless network is provided. The apparatus includes at least one processor configured to measure a RSSI at a femto node and determine a comparison between the RSSI, a noise floor, and a threshold RSSI. The at least one processor is further configured to adjust a transmission parameter of the femto node based on the comparison. The apparatus further includes a memory coupled to the at least one processor.

In yet another aspect, an apparatus for performing power control for a femto node deployed in a wireless network is provided. The apparatus includes means for determining a comparison between a RSSI measured at a femto node, a noise floor, and a threshold RSSI. The apparatus further includes means for adjusting a transmission parameter of the femto node based on the comparison.

Still, in another aspect, a computer-program product for performing power control for a femto node deployed in a wireless network is provided including a non-transitory computer-readable medium having code for causing at least one computer to measure a RSSI at a femto node and code for causing the at least one computer to determine a comparison between the RSSI, a noise floor, and a threshold RSSI. The computer-readable medium further includes code for causing the at least one computer to adjust a transmission parameter of the femto node based on the comparison.

Moreover, in an aspect, an apparatus for performing power control for a femto node deployed in a wireless network is provided that includes a signal energy measuring component for determining a comparison between a RSSI measured at a femto node, a noise floor, and a threshold RSSI. The apparatus further includes a transmission adjusting component for adjusting a transmission parameter of the femto node based on the comparison.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements.

FIG. 12 illustrates an example of a coverage map having several defined tracking areas.

DETAILED DESCRIPTION

Figure 1:
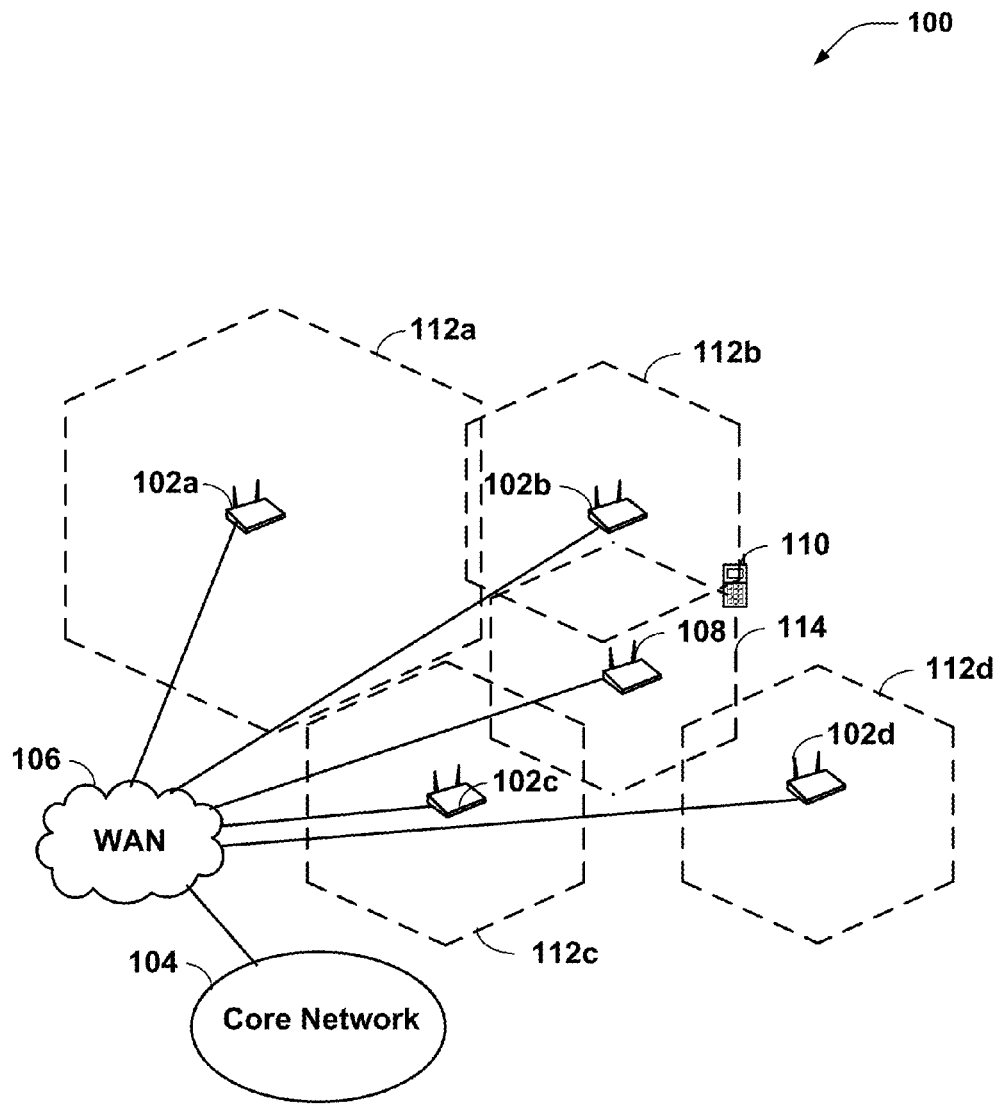
FIG. 1 is a block diagram of an example wireless communication system for employing a plurality of femto nodes.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

As described further herein, a transmit power of a low power base station, such as a femto node, can be calibrated based on measured signal qualities at the femto node in a wireless network. For example, the femto node can measure signal energy parameters, such as received signal strength indicator (RSSI), pilot amplitude (Ecp), a ratio of a pilot signal amplitude to a received signal level (Ecp/Io), signal-to-noise ratio (SNR), etc. of one or more received signals. A transmit power for the femto node is accordingly set based on comparing the parameters to one or more thresholds, noise floors, etc. In one example, a centralized entity can set the transmit power for one or more femto nodes based on the measured parameters, which can be received from one or more femto nodes. In either case, the thresholds can be tuned for a given femto node to provide coverage in certain areas, to achieve a network performance, and/or the like. Moreover, the transmit power adjustment can be performed periodically for one or more femto nodes as radio conditions can change based on addition of other femto nodes, device mobility, and/or the like.

A low power base station, as referenced herein, can include a femto node, a pico node, micro node, home Node B or home evolved Node B (H(e)NB), relay, and/or other low power base stations, and can be referred to herein using one of these terms, though use of these terms is intended to generally encompass low power base stations. For example, a low power base station transmits at a relatively low power as compared to a macro base station associated with a wireless wide area network (WWAN). As such, the coverage area of the low power base station can be substantially smaller than the coverage area of a macro base station. Moreover, for example, low power base stations can be deployed in user homes, offices, other venues, utility polls, public transit, and/or substantially any area to serve a number of devices. For example, a given low power base station may use a smaller scale antenna array that may be attached to a housing for the base station or to a common mounting platform.

As used in this application, the terms "component," "module," "system" and the like are intended to include a computer-related entity, such as but not limited to hardware, firmware, a combination of hardware and software, software, or software in execution, etc. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE), etc. A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, a tablet, a smart book, a netbook, or other processing devices connected to a wireless modem, etc. Moreover, various aspects are described herein in connection with a base station. A base station may be utilized for communicating with wireless terminal(s) and may also be referred to as an access point, a Node B, evolved Node B (eNB), or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE/LTE-Advanced and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

FIG. 1 illustrates an exemplary autonomously controlled wireless communications system 100 including a plurality of femto nodes 102*a-d*, or other low power base stations, in communication with an operator core network 104 via a WAN 106. As described, femto nodes 102*a-d* may comprise relatively low power equipment and may not be provided with a conventional transmission tower. Each femto node 102*a-d* may be installed and activated in arbitrary chronological order, at an unplanned location. For example, a network operator may provide femto nodes to various different third parties. While the network operator may install and operate some femto nodes in the system 100, each femto node may be autonomously controlled as described herein, and can be added and removed from the system 100 in a flexible, ad-hoc manner.

Each of the activated femto nodes 102*a-d* may provide service to UEs, such as UEs 110, located within corresponding coverage areas 112*a-d*. For example, a coverage area 112*a* may be provided by femto node 102*a*, and so forth. It should be appreciated that coverage areas 112*a-d* may not have a regular or uniform geometrical shape, and may vary in shape and extent based on local factors such as topology of the landscape and the presence or absence of blocking objects in an area. For example, the femto nodes 102*a-d* can initialize transmit power to establish coverage areas 112*a-d* based on aspects described with respect to femto node 108 herein, such as computing a transmit power based on observed signal energy parameters. It is to be appreciated that transmit power can be initialized subject to a minimum and/or maximum transmit power as well.

Femto node 108 can be deployed within the existing network including femto nodes 102*a-d*. Once powered on, activated, etc., the femto node 108 can be used to access the wireless communication system 100 in a corresponding coverage area 114. The coverage area 114 is related to transmit power of the femto node 108, which can be determined based on measuring one or more signal energy parameters at femto node 108. For example, femto node 108 can measure an RSSI, Ecp, Ecp/Io, SNR, etc. over a channel dedicated to the network on which femto nodes 102*a-d* operate. Based on the signal energy parameters, femto node 108 can initialize or adjust a transmit power to provide adequate coverage while attempting to mitigate potential interference caused to femto nodes 102*a-d* and/or UEs communicating therewith. For example, femto node 108 can measure the signal energy parameters by using a transceiver thereof, by using a co-located network listening module (NLM) in femto node 108, based on measurements received from one or more UEs communicating with femto node 108, and/or the like.

In any case, femto node 108 sets the transmit power based in part on comparing the measured signal energy parameters to one or more thresholds. The thresholds can be tuned to achieve a desired network propagation and/or performance through femto node transmit power initialization or adjustment. Thus, for example, femto node 108 and femto nodes 102*a-d* can periodically update their respective transmit power as the network environment changes due to addition or removal of femto nodes, UE mobility, physical location changes, etc. Further, femto node 108 and femto nodes 102*a-d* can update transmit power based on a timer or other event, which can include local events at the given femto node (e.g., detecting signal energy or backhaul quality change over a threshold, detecting change in load at the femto node), notification of other events (e.g., notification of a new femto node received over a backhaul link or from a served UE), and/or the like.

In other examples, femto node 108 and/or femto nodes 102*a-d*, etc. can report measured signal energy parameters and/or other parameters (e.g., loading parameters, location of the femto node 180 or 102*a-d*, number and power of neighboring femto nodes, etc.) to a centralized entity (not shown), which can be part of core network 104. In this example, the centralized entity can perform the transmit power determinations and accordingly communicate a transmit power or related adjustment to femto node 108 and/or other femto nodes. In this regard, signal energy measurements of multiple femto nodes, in addition or alternatively to other parameters, such as loading parameters, location, number and power of neighboring nodes, and/or the like, can be considered for adjusting transmit power of one femto node, such as femto node 108.

Figure 2:
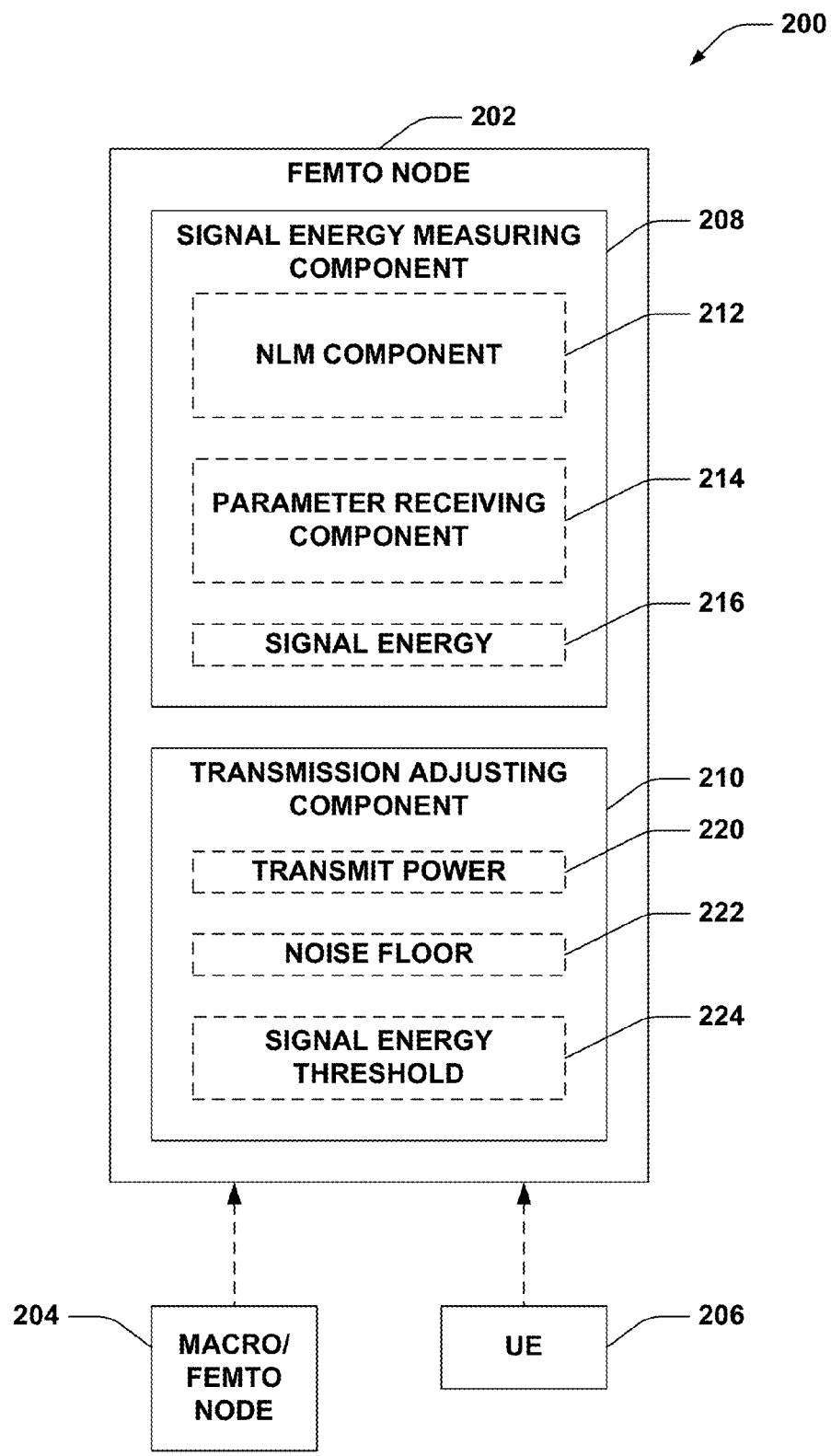
FIG. 2 is a block diagram of an example system for adjusting transmission parameters of femto nodes based on measured signal energy parameters.

Referring to FIG. 2, an example wireless communication system 200 is illustrated that facilitates adjusting transmission parameters of a femto node based on signal energy measurements. System 200 includes a femto node 202 that can measure signals of a macro/femto node 204 or UE 206, signal measurements reported by a macro/femto node 204 or UE 206, and/or the like. Femto node 202 can be substantially any low power base station, or portion thereof, as described, a UE (e.g., communicating in peer-to-peer or ad-hoc mode with other UEs), etc. Macro/femto node 204 can be a macro node, pico node, femto node, mobile base station, a UE, a portion thereof, etc. UE 206 can be a mobile terminal, stationary device, modem (or other tethered devices), a portion thereof, and/or substantially any device that wirelessly communicates with femto and/or macro nodes.

Femto node 202 can include a signal energy measuring component 208 for measuring signal energy over a period of time, and a transmission adjusting component 210 for modifying transmit power or other transmission parameter of femto node 202 based on signal energy measurements. Signal energy measuring component 208 can include a NLM component 212 for receiving signals from one or more nodes (e.g., macro or femto nodes, or other nodes operating on a frequency utilized by a wireless network), and/or a parameter receiving component 214 for obtaining one or more signal energy measurements or other parameters from one or more UEs communicating with femto node 202.

According to an example, signal energy measuring component 208 can obtain one or more parameters for determining a signal energy 216 measured in an environment near femto node 202. For example, this can occur based on initializing or powering on femto node 202, based on a detected change in one or more signal energy or other radio frequency RF parameters, based on a timer or other event (such as a detected change in load at femto node 202, a notification of another femto node added to the wireless network), etc. For example, the measurements of signal energy 216 can relate to received signal strength indicator (RSSI), signal-to-noise ratio (SNR), signal-to-interference-and-noise ratio (SINR), a pilot amplitude (Ecp), a ratio of a pilot signal amplitude to a received signal level (Ecp/Io), or other signal energy measurements.

In one example, an NLM component 212 or a transceiver of femto node 202 can measure the signal energy 216 over a period of time, which can include measuring energy related to signals from macro/femto node 204, UE 206, and/or additional neighboring nodes observed during the period of time. In another example, parameter receiving component 214 can obtain measurements of signal energy 216 performed by UE 206 or one or more other UEs served by femto node 202 over the period of time. For instance, signal energy measuring component 208 can obtain or otherwise measure the signal energy 216 over a downlink channel in a wireless network. In this regard, transmission parameters can be adjusted based on the measured signal energy to mitigate interference to other nodes communicating over the downlink channel. In any case, transmission adjusting component 210 can adjust a transmission parameter based in part on the signal energy 216.

For example, transmission adjusting component 210 can compute a transmit power 220 or determine other parameters, such as a modulation and coding scheme (MCS), frequency/time resource utilization, access mode (e.g., open, closed, or hybrid access modes for femto nodes), antenna selection, antenna pattern selection, and/or the like, based on the signal energy. In one example, transmission adjusting component 210 compares the signal energy 216 to one or more thresholds to determine the transmission parameter adjustment. Femto node 202, for example, can maintain a noise floor 222 that the femto node 202 is allowed to experience without adjusting transmit power to compensate. In addition, femto node 202 can maintain a signal energy threshold 224 for determining a transmit power 220 adjustment. Transmission adjusting component 210 can determine noise floor 222, signal energy threshold 224, or other thresholds from hardcoded or otherwise configured parameters. In another example, transmission adjusting component 210 can adjust such thresholds, or such thresholds can be configured by an operator, to achieve a desired network coverage or performance. In this regard, transmission adjusting component 210 can adjust the thresholds based on at least one of a location of femto node 202, a number of neighboring femto nodes, signal energy observed of the neighboring femto nodes, parameters determined based on a history of performance metrics using previous thresholds, and/or the like.

In one specific example, transmission adjusting component 210 measures signal energy 216 respective to the noise floor 222. If signal energy 216 is below the noise floor, transmission adjusting component 210 can set the transmit power 220 as:

$$P_{tx} = P_{max}$$

where $P_{tx}$ is the transmit power 220, and $P_{max}$ is a maximum transmit power. For example, $P_{max}$ can be a hardcoded or otherwise configured parameter of femto node 202, and/or can be adjusted as described above with respect to thresholds at femto node 202 (e.g., based on a location of the femto node, a number of neighboring femto nodes, etc., as described further herein). Where signal energy 216 is over the noise floor 222, in this example, transmission adjusting component 210 can compare the signal energy 216 to signal energy threshold 224. If the signal energy 216 is under signal energy threshold 224, transmission adjusting component 210 can set the transmit power 220 according to the following formula, for example:

$$P_{tx} = P_{min} + \frac{P_{max} - P_{min}}{RSSI_{thres} - No} * (RSSI_{meas} - No)$$

where $P_{min}$ is a minimum transmit power, $RSSI_{thres}$ is the signal energy threshold 224, which can be an RSSI threshold, $RSSI_{meas}$ is signal energy 216 as measured or otherwise received, which can be a measured RSSI, and No is the noise floor 222. It is to be appreciated that other interpolations between $P_{min}$ and $P_{max}$ (e.g., linear or otherwise) can be used to determine the transmit power 220 in this case. If the signal energy 216 is over the signal energy threshold 224, for example, transmission adjusting component 210 can determine not to transmit for at least a period of time, or can otherwise set transmit power 220 to zero or $P_{min}$. It is to be appreciated that though RSSI is shown and described in the above formulas as the signal energy 216 and corresponding signal energy threshold 224, SNR, SINR, Ecp, Ecp/Io, or other measurements can be used instead of or in addition to RSSI, as described.

Thus, using the above described formula, the transmit power 220 can be relatively low in presence of neighboring nodes, such as macro/femto node 204, or relatively high when deployed in an area with poor existing coverage. In this regard, the value of the signal energy threshold 224 can determine a minimum separation between adjacent cells and can be tuned for different environments. For example, in a suburban environment, RSSI observed from femto node 202 placed near a window of a structure may be relatively high even at a large distance from femto node 202 due to a lesser number of competing femto nodes. This femto node 202, however, may be unable to serve all UEs in the area due to capacity limitations. Thus, in this example, signal energy threshold 224 in the suburban area can be higher than in a dense urban area.

In another example, where femto node 202 is in a dense urban area, the signal energy threshold 224 may be set so low that signal energy 216 almost always exceeds the threshold 224, and thus transmission adjusting component 210 maintains transmit power 220 of zero, or effectively prevents femto node 202 from transmitting. In one example, transmission adjusting component 210 can set the signal energy threshold 224 based on detecting one or more parameters of the area, such as a location (e.g., absolute or relative to one or more other femto nodes), a determined or received number of femto nodes within a specified distance of femto node 202, an RSSI threshold received from a neighboring femto node, and/or the like.

Moreover, in an example, mobility of UEs and/or changes in cell loading over time can result in a dynamic network, and as a result, RSSI can change among femto nodes as additional UEs are accommodated or move away from the femto node 202 and neighboring femto nodes. In this example, the signal energy measuring and transmission parameter adjusting can occur periodically based on a timer or a detected event, such as a determined change in RSSI at femto node 202, an indication of new neighboring femto nodes received at femto node 202 (e.g., from macro/femto node 204 or other network components, UE 206, and/or the like), a detected or indicated change in load at femto node 202 or other neighboring femto nodes, etc.

In other examples, transmission adjusting component 210 can compare signal energy 216 to a threshold to determine a MCS. For example, where the signal energy 216 is below the threshold, transmission adjusting component 210 can select a MCS that allows for modulating data over an increased number of resources than where signal energy 216 is below the threshold. Similarly, transmission adjusting component 210 can increase frequency/time resource utilization where signal energy 216 is below the threshold to achieve a desired network propagation.

In other examples, transmission adjusting component 210 can modify an access mode (e.g., open, closed, or hybrid access modes for femto nodes) based on comparing signal energy 216 to the threshold. For example, femto nodes can operate in an open access mode where substantially any UE is allowed access to the femto node, a closed access mode where only some UEs are allowed to access the femto node (e.g., UEs in a closed subscriber group (CSG), as described further herein), or a hybrid access mode where the femto node can provide varying levels of access to a given UE (e.g., improved access to UEs in a CSG as opposed to those not in the CSG). Where the signal energy 216 from other nodes are below a threshold, this can indicate a coverage gap, and thus transmission adjusting component 210 may choose to operate femto node 202 in an open mode, to serve UEs in the coverage gap. Moreover, transmission adjusting component 210 can modify antenna selection, antenna pattern selection (e.g., a number of antennas used to communicate and/or selecting certain antennas for communicating), and/or the like according to the signal energy 216 threshold comparison. Though one threshold is described, it is to be appreciated that multiple thresholds can be used to determine different transmit parameters, and/or the transmission adjusting component 210 can determine transmit parameters as a function of the signal energy 216 and/or a difference thereof from the threshold.

Figure 3:
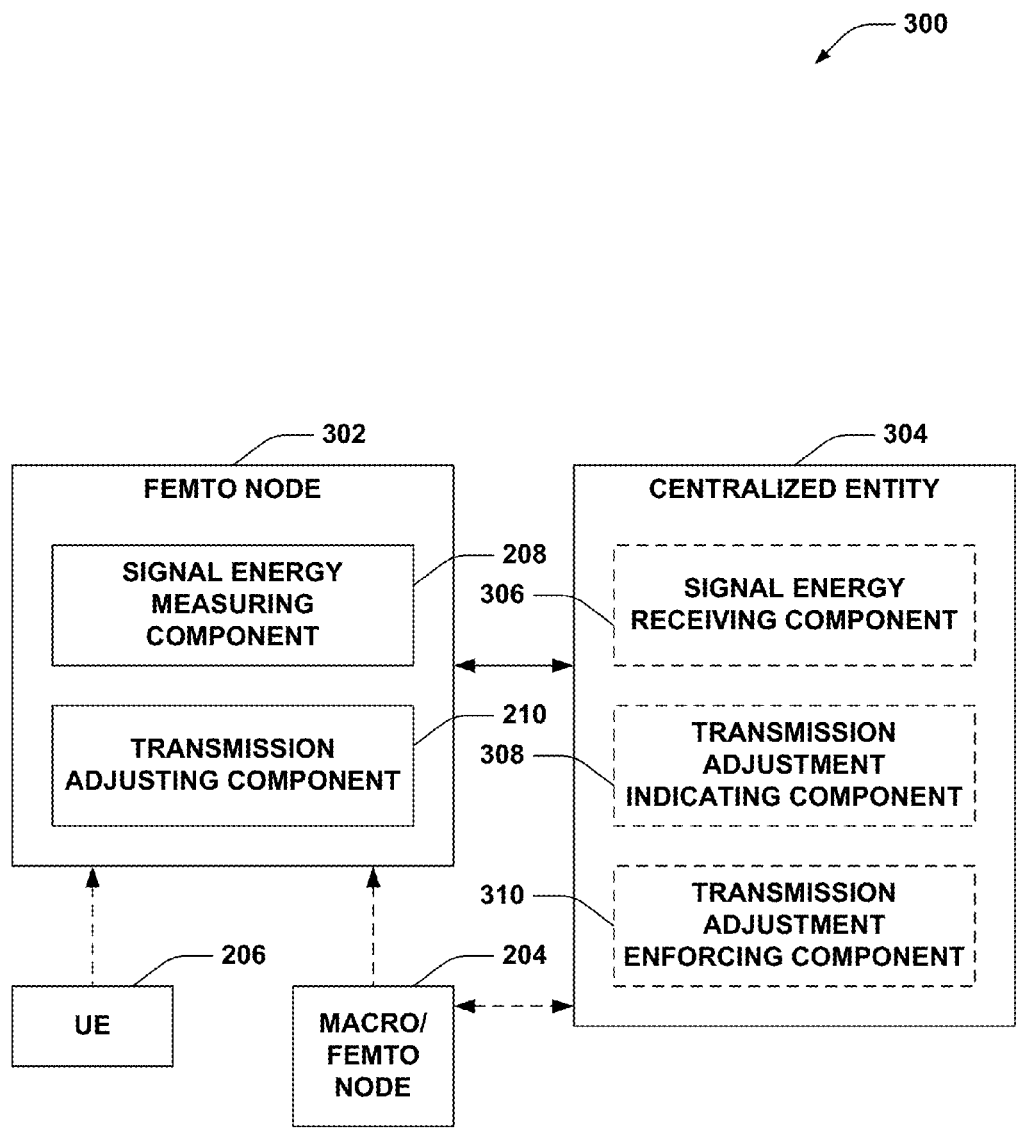
FIG. 3 is a block diagram of an example system for adjusting transmission parameters of one or more femto nodes based on received signal energy parameters.

Turning to FIG. 3, an example wireless communication system 300 is illustrated for provisioning transmission adjustment information to one or more femto nodes. System 300 includes a femto node 302 that communicates in a wireless network, as described. System 300 also includes a macro/femto node 204 and UE 206, from which femto node 302 can receive signal energy information, as described. System 300 additionally includes a centralized entity 304 that can communicate with one or more femto nodes in a wireless network, such as femto node 302 and/or macro/femto node 204 to provision transmission adjustment information thereto.

For example, centralized entity 304 can be a H(e)NB gateway or other femto node gateway in a core wireless network, another supporting node in the wireless network, a specific femto node responsible for provisioning transmission adjustment information to other femto nodes in a similar network or grouping of femto nodes (e.g., nodes in a given closed subscriber group (CSG)), a server or other computing device operating in one or more networks, and/or the like. Femto node 302 and/or macro/femto node 204 can communicate with centralized entity 304 over a backhaul or other connection to a wireless network within which the centralized entity 304 operates.

Femto node 302 includes a signal energy measuring component 208 for determining one or more parameters related to a signal energy near femto node 302, and a transmission adjusting component 210 for modifying one or more transmission parameters based on the signal energy measurements, as described.

Centralized entity 304 optionally includes a signal energy receiving component 306 for obtaining one or more parameters related to signal energy measurements from a femto node, and/or a transmission adjustment indicating component 308 for provisioning a transmission adjustment to femto node 302 based on the one or more parameters. Centralized entity 304 can also optionally include a transmission adjustment enforcing component 310 for providing a transmission adjustment mechanism or algorithm to one or more femto nodes to ensure uniform transmission adjustment control.

According to an example, signal energy measuring component 208 can perform or otherwise receive measurements of one or more signal energy parameters, as described above, such as a RSSI, SNR, SINR, Ecp, Ecp/Io, and/or the like, which can be obtained via an NLM component, a transceiver, a UE 206, or other nodes. Signal energy measuring component 208 can provide the parameters to centralized entity 304. Signal energy receiving component 306 can obtain the one or more parameter related to signal energy measurements from femto node 302. In other examples, signal energy receiving component 306 can measure the parameters and/or obtain the parameters from UEs, such as UE 206, communicating with one or more femto nodes. In addition, signal energy receiving component 306 can receive the parameters from a plurality of femto nodes.

In an example, transmission adjustment indicating component 308 can determine an adjusted value for a transmission parameter, such as a transmit power for one or more femto nodes, based on the signal energy parameters, and can communicate the adjustment value to femto node 302. This can occur as described above, such that the computing functionality is moved from the femto node 302 to centralized entity 304. In another example, transmission adjustment indicating component 308 can consider signal energy parameters measured by additional macro/femto nodes, such as macro/femto node 204, for determining a transmission adjustment for femto node 302. Transmission adjustment indicating component 308 can determine signal energy parameters for a neighboring macro/femto node of femto node 302, for instance, based on signal energy parameters received from femto node 302 and other femto nodes. Thus, transmission adjustment indicating component 308 can generate transmission adjustments based on the determined signal energy parameters measured at multiple sources. In another example, transmission adjustment indicating component 308 can generate transmission adjustments for femto node 302 based in part on transmission adjustments generated for other femto nodes near femto node 302.

Moreover, for example, transmission adjustment indicating component 308 can obtain and utilize additional parameters in computing a transmission parameter adjustment for femto node 302, such as loading parameters, location of the femto node 302, number and power of neighboring femto nodes, etc. In one example, where femto node 302 is in an area saturated with femto nodes, it is possible that the signal energy is almost always over a threshold, as described in FIG. 2. In one example, transmission adjustment indicating component 308 can consider a time since a last transmission at a given femto node in assigning a transmission parameter adjustment to facilitate balancing transmission opportunities among multiple femto nodes in the saturated area with some level of fairness. Transmission adjustment indicating component 308 can receive such timing information from femto node 302, determine the timing information based on previous transmission adjustments provisioned to the femto node 302, and/or the like.

In any case, transmission adjustment indicating component 308 can generate the transmission adjustments using formulas similar to those described above, where thresholds can be set to arrive at certain network coverage and/or performance metrics. Transmission adjustment indicating component 308 can communicate the transmission adjustment to femto node 302. Transmission adjusting component 210 can obtain the transmission adjustment and accordingly effectuate the adjustment (e.g., modify a transmit power of femto node 302 where the transmission adjustment relates to transmit power). In this regard, transmission parameters related to femto node 302 and/or other femto nodes, such as macro/femto node 204, can be adjusted based on signal energy and/or other parameters of nearby femto nodes to provide the desired network coverage and/or performance.

As described, adaptability of a wireless communication system to changes in activated access points (e.g., activation, deactivation, or change in transmit power) is an advantageous result of the described aspects. To achieve this result, femto nodes in the system can make use of power control functions that are compatible between nodes. For example, an autonomous transmit power control method used by a femto node can be known or at least discoverable by another femto node (e.g., either expressly or implicitly) and vice versa. Implicit discovery may include enforcing an identical or backward-compatible version of autonomous transmit power control algorithm in all femto nodes of the system (or at least for a group of associated femto nodes). Moreover, in this example, version control of autonomous transmit power control may be performed by a core network entity at the time a new femto node is connecting to the network system.

In this example, transmission adjustment enforcing component 310 can provision one or more parameters regarding transmit power control to femto node 302 and/or other femto nodes, such as macro/femto node 204, upon connecting to a wireless network. Before enabling use of the new femto node 302, for example, transmission adjustment enforcing component 310 can confirm that the femto node 302 uses a compatible autonomous transmit power control. This can be a query performed to the femto node 302 and based on a received response, a verification performed in subscription information for the femto node 302, a query to one or more other network components associated with femto node 302, and/or the like. In one example, this can include verifying compatible version information of the transmit power control algorithm. If compatibility can be confirmed, the transmission adjustment enforcing component 310 may enable connection and operation of the femto node 302. If compatibility cannot be confirmed, the transmission adjustment enforcing component 310 may provide a compatible software component to the femto node, disable connection of the femto node to the network (e.g., at least until a provided software component is installed on the femto node and compatibility can be confirmed), and/or the like. Thus, transmission adjustment enforcing component 310 can ensure that femto nodes 302 communicating in the network use a compatible transmit power control algorithm to facilitate calibration as described herein.

Figure 4:
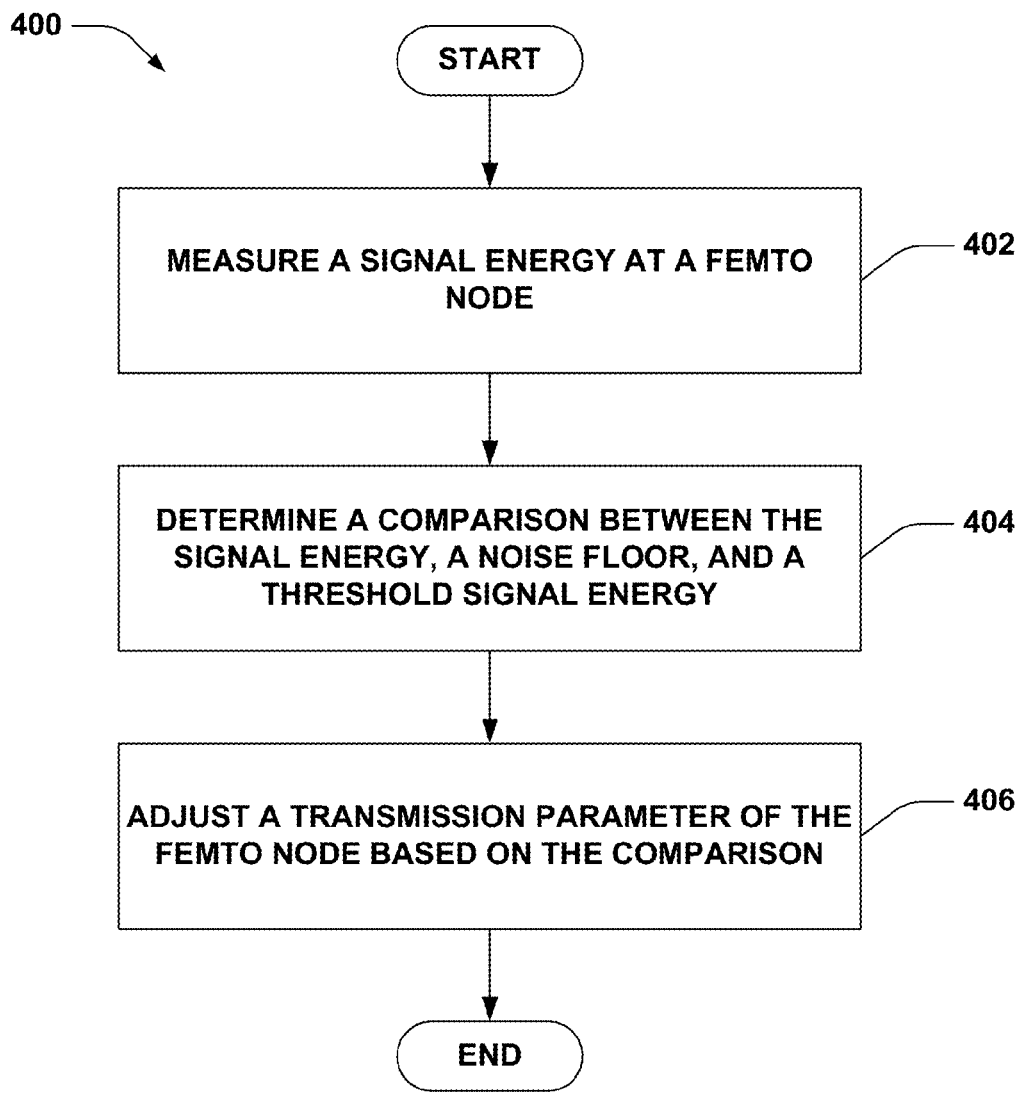
FIG. 4 is a flow chart of an aspect of an example methodology for adjusting a transmission parameter based on one or more signal energy parameters.
Figure 5:
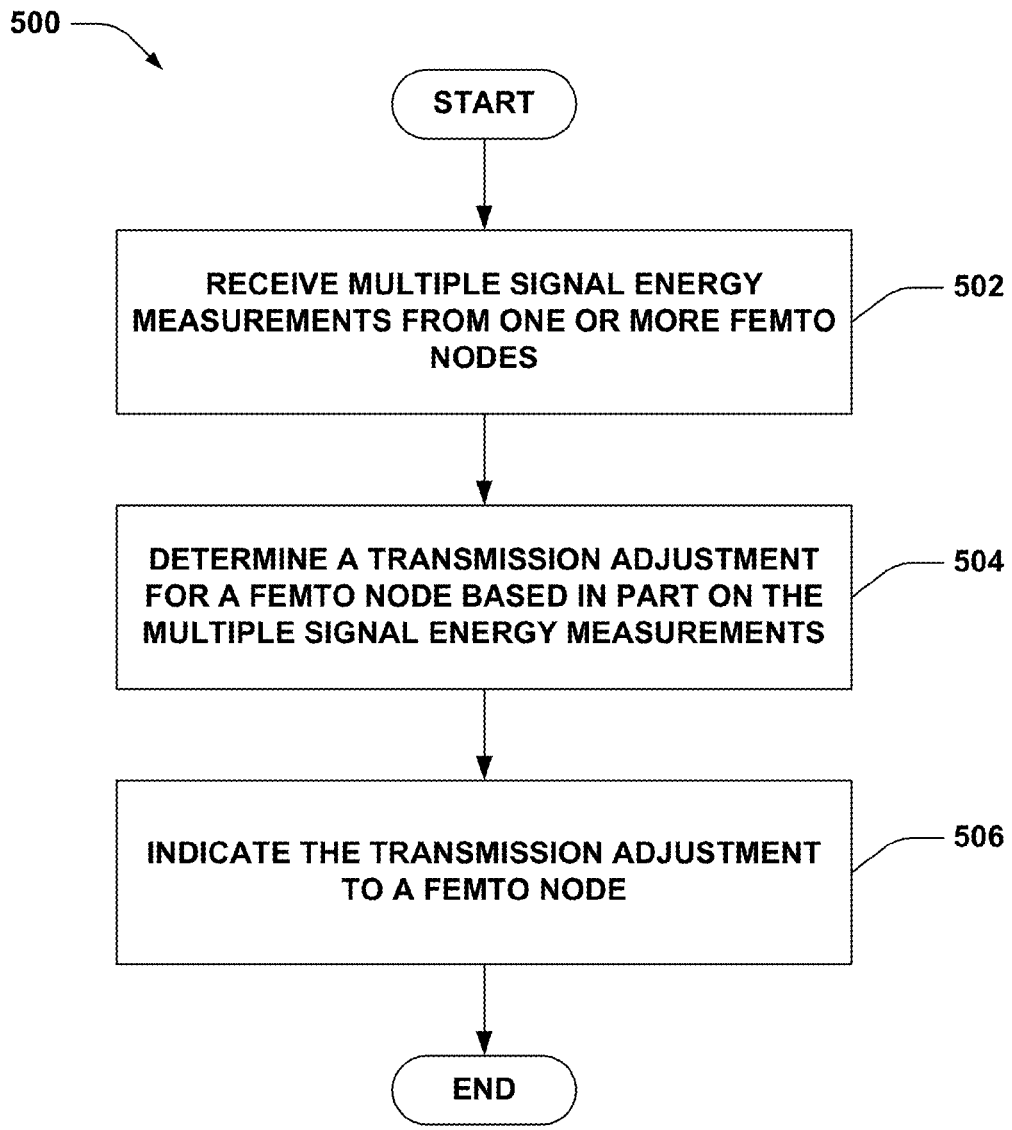
FIG. 5 is a flow chart of an aspect of an example methodology for indicating transmission parameter adjustment based on one or more signal energy parameters.

FIGS. 4-5 illustrate example methodologies relating to modifying transmission parameters based on measured signal energy. While, for purposes of simplicity of explanation, the methodologies are shown and described as a series of acts, it is to be understood and appreciated that the methodologies are not limited by the order of acts, as some acts may, in accordance with one or more embodiments, occur concurrently with other acts and/or in different orders from that shown and described herein. For example, it is to be appreciated that a methodology could alternatively be represented as a series of interrelated states or events, such as in a state diagram. Moreover, not all illustrated acts may be required to implement a methodology in accordance with one or more embodiments.

FIG. 4 depicts an example methodology 400 for adjusting transmission parameters of a femto node based on measured signal energy. In one example, the methodology 400 can be performed by femto nodes 102a-d, 108, and/or 202, centralized entity 304, or related components, processors, etc.

At 402, a signal energy can be measured at a femto node. This can include measuring received signals at a transceiver, NLM, or other component of the femto node. The signal energy can be measured as a RSSI, SNR, SINR, Ecp, Ecp/Io, etc., as described. Moreover, the signal energy can be measured over one or more periods of time. In another example, the signal energy can be received as measurements performed by one or more UEs, which can be served by, or otherwise operating within a threshold distance of, the femto node.

At 404, a comparison between the signal energy, the noise floor, and the threshold signal energy can be determined. For example, this can include comparing the signal energy to the noise floor and threshold for determining a difference from which a transmission parameter adjustment can be computed.

Thus, at 406, a transmission parameter of the femto node can be adjusted based on the comparison. In one example, where the signal energy is below the noise floor, a transmit power of the femto node can be set at a maximum power. Where the signal energy is above the noise floor but below the threshold signal energy, the transmit power of the femto node can be interpolated between a minimum and maximum transmit power based on a difference between the signal energy and the threshold signal energy. Where the signal energy is above the threshold signal energy, the transmit power of the femto node can be set to zero or a minimum transmit power to prevent emitting signal energy over the current signal energy already exceeding the threshold.

In one example, where implemented by a centralized entity, measuring the signal energy can include receiving the signal energy measurements from the femto node or related UEs. In this regard, the transmission parameter adjustment can relate to determining an adjustment value or a value for a parameter of the femto node, and communicating the adjustment value or value to the femto node.

FIG. 5 illustrates an example methodology 500 for determining transmission adjustments for one or more femto nodes based on received signal energy parameters. In one example, the methodology 500 can be performed by centralized entity 304, substantially any femto node in a network of femto nodes, or related components, processors, etc.

At 502, multiple signal energy measurements can be received from one or more femto nodes. For example, this can include receiving multiple RSSI measurements at the femto nodes. For example, the measurements can be received from a femto node desiring a transmission adjustment based on the measurements, from one or more UEs served by the femto node, and/or the like. In one example, where multiple measurements are received, the measurements can be averaged or otherwise combined to generate a more accurate representation of RSSI given the multiple measurements.

At 504, a transmission adjustment can be determined for a femto node based in part on the multiple signal energy measurements. As described, this can include computing the adjustment using the measurements and related thresholds that are set to achieve a certain network coverage and/or performance. Moreover, the transmission adjustment can correspond to a transmit power, MCS, or other transmission parameter for the femto node, and can be an adjustment value or an actual value for the parameter at the femto node.

At 506, the transmission adjustment can be indicated to the femto node. For example, this can occur via backhaul communication to the femto node. Thus, the femto node can accordingly adjust a transmission parameter based on the indicated transmission adjustment.

It will be appreciated that, in accordance with one or more aspects described herein, inferences can be made regarding measuring signal energy parameters, adjusting the thresholds to achieve a certain network coverage and/or performance, determining the transmission adjustment based on the parameters and thresholds, and/or the like, as described. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 6:
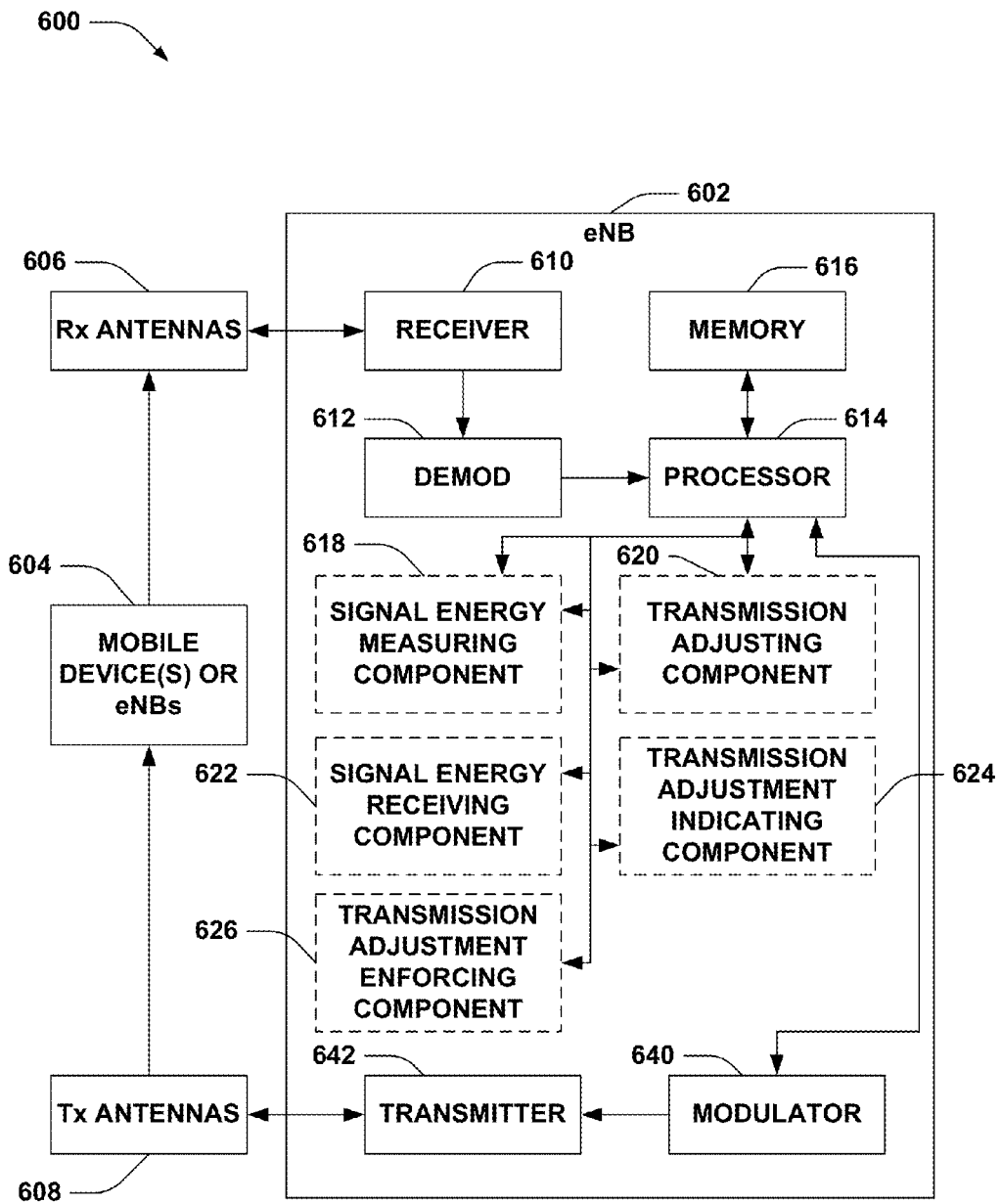
FIG. 6 is a block diagram of a system in accordance with aspects described herein.

FIG. 6 is an illustration of a system 600 that facilitates adjusting transmission parameters based on signal energy measurements. System 600 includes a eNB 602 having a receiver 610 that receives signal(s) from one or more mobile devices or eNBs 604 through a plurality of receive antennas 606 (e.g., which can be of multiple network technologies), and a transmitter 642 that transmits to the one or more mobile devices or eNBs 604 through a plurality of transmit antennas 608 (e.g., which can be of multiple network technologies). For example, eNB 602 can transmit signals received from eNBs 604 to other eNBs 604, and/or vice versa. Receiver 610 can receive information from one or more receive antennas 606 and is operatively associated with a demodulator 612 that demodulates received information. In addition, in an example, receiver 610 can receive from a wired backhaul link. Though depicted as separate antennas, it is to be appreciated that at least one of receive antennas 606 and a corresponding one of transmit antennas 608 can be combined as the same antenna. Demodulated symbols are analyzed by a processor 614, which is coupled to a memory 616 that stores information related to performing one or more aspects described herein.

Processor 614, for example, can be a processor dedicated to analyzing information received by receiver 610 and/or generating information for transmission by a transmitter 642, a processor that controls one or more components of eNB 602, and/or a processor that analyzes information received by receiver 610, generates information for transmission by transmitter 642, and controls one or more components of eNB 602. In addition, processor 614 can perform one or more functions described herein and/or can communicate with components for such a purpose.

Memory 616, as described, is operatively coupled to processor 614 and can store data to be transmitted, received data, information related to available channels, data associated with analyzed signal and/or interference strength, information related to an assigned channel, power, rate, or the like, and any other suitable information for estimating a channel and communicating via the channel. Memory 616 can additionally store protocols and/or algorithms associated with measuring signal energy parameters, adjusting transmission parameters, and/or the like.

It will be appreciated that the data store (e.g., memory 616) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 616 of the subject systems and methods is intended to comprise, without being limited to, these and any other suitable types of memory.

Processor 614 is further optionally coupled to a signal energy measuring component 618, which can be similar to signal energy measuring component 208, a transmission adjusting component 620, which can be similar to transmission adjusting component 210, a signal energy receiving component 622, which can be similar to signal energy receiving component 306, a transmission adjustment indicating component 624, which can be similar to transmission adjustment indicating component 308, and/or a transmission adjustment enforcing component 626, which can be similar to transmission adjustment enforcing component 310. Moreover, for example, processor 614 can modulate signals to be transmitted using modulator 640, and transmit modulated signals using transmitter 642. Transmitter 642 can transmit signals to mobile devices or eNBs 604 over Tx antennas 608. Furthermore, although depicted as being separate from the processor 614, it is to be appreciated that the signal energy measuring component 618, transmission adjusting component 620, signal energy receiving component 622, transmission adjustment indicating component 624, transmission adjustment enforcing component 626, demodulator 612, and/or modulator 640 can be part of the processor 614 or multiple processors (not shown), and/or stored as instructions in memory 616 for execution by processor 614.

Figure 7:
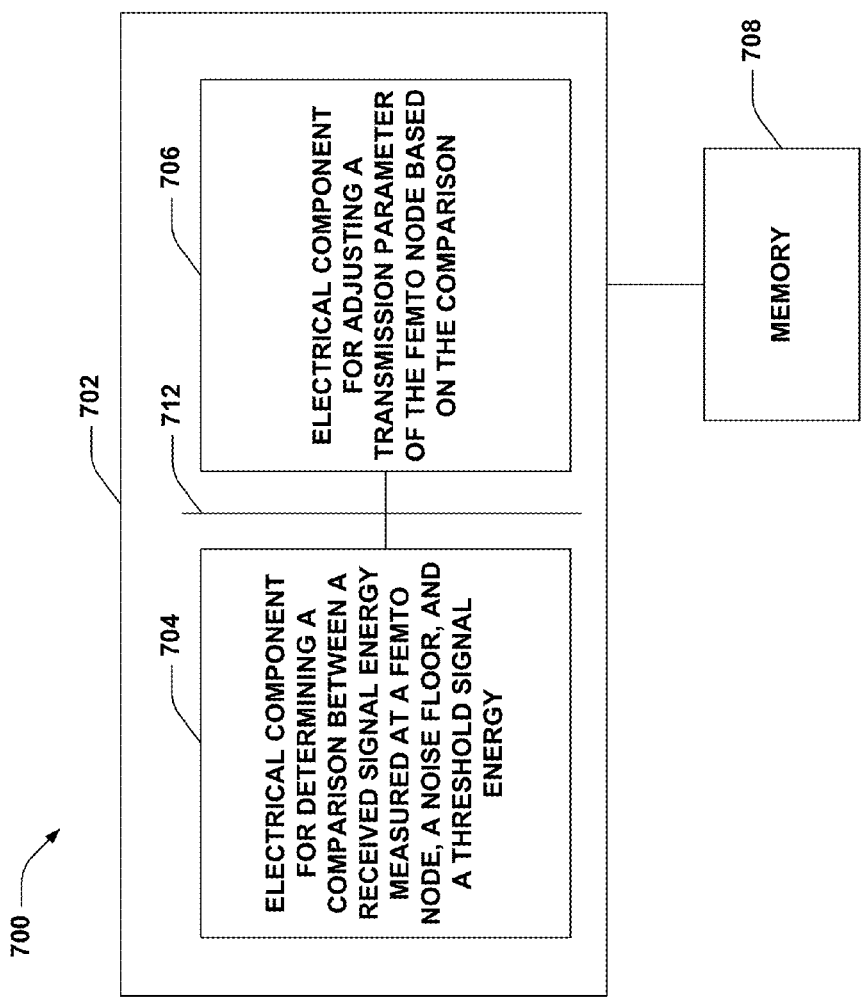
FIG. 7 is a block diagram of an aspect of a system that adjusts a transmission parameter based on one or more signal energy parameters.

FIG. 7 illustrates a system 700 for adjusting a transmission parameter of a femto node based on one or more measured signal energy parameters. For example, system 700 can reside at least partially within a femto node or other low power base station, a centralized entity, etc. It is to be appreciated that system 700 is represented as including functional blocks, which can be functional blocks that represent functions implemented by a processor, software, or combination thereof (e.g., firmware). System 700 includes a logical grouping 702 of electrical components that can act in conjunction. For instance, logical grouping 702 can include an electrical component for determining a comparison between a received signal energy at a femto node, a noise floor, and a threshold signal energy 704. Further, logical grouping 702 can include an electrical component for adjusting a transmission parameter of the femto node based on the comparison 706.

As described, for example, the transmission parameter can be adjusted as a function of the signal energy, noise floor, and/or signal energy threshold depending on the results of the comparison. For example, electrical component 704 can include a signal energy measuring component 208, NLM component 212, parameter receiving component 214, etc., as described above. In addition, for example, electrical component 706, in an aspect, can include a transmission adjusting component 210, as described.

Additionally, system 700 can include a memory 708 that retains instructions for executing functions associated with the electrical components 704 and 706. While shown as being external to memory 708, it is to be understood that one or more of the electrical components 704 and 706 can exist within memory 708. Moreover, for example, electrical components 704 and 706 can be interconnected by a bus 712. In one example, electrical components 704 and 706 can include at least one processor, or each electrical component 704 and 706 can be a corresponding module of at least one processor. Moreover, in an additional or alternative example, electrical components 704 and 706 can be a computer program product comprising a computer readable medium, where each electrical component 704 and 706 can be corresponding code.

Figure 8:
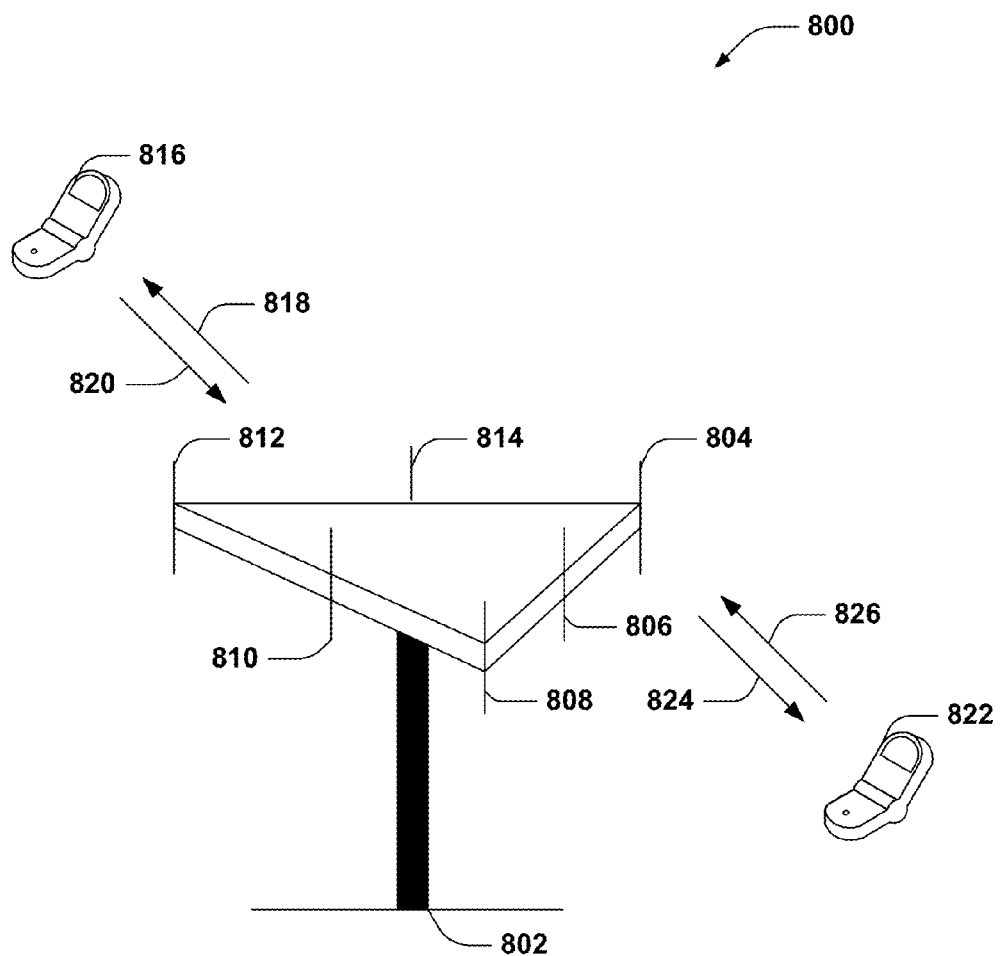
FIG. 8 is a block diagram of an aspect of a wireless communication system in accordance with various aspects set forth herein.

FIG. 8 illustrates a wireless communication system 800 in accordance with various embodiments presented herein. System 800 comprises a base station 802 that can include multiple antenna groups. For example, one antenna group can include antennas 804 and 806, another group can comprise antennas 808 and 810, and an additional group can include antennas 812 and 814. Two antennas are illustrated for each antenna group; however, more or fewer antennas can be utilized for each group. Base station 802 can additionally include a transmitter chain and a receiver chain, each of which can in turn comprise a plurality of components or modules associated with signal transmission and reception (e.g., processors, modulators, multiplexers, demodulators, demultiplexers, antennas, etc.), as is appreciated.

Base station 802 can communicate with one or more mobile devices such as mobile device 816 and mobile device 822; however, it is to be appreciated that base station 802 can communicate with substantially any number of mobile devices similar to mobile devices 816 and 822. Mobile devices 816 and 822 can be, for example, cellular phones, smart phones, laptops, handheld communication devices, handheld computing devices, satellite radios, global positioning systems, PDAs, and/or any other suitable device for communicating over wireless communication system 800. As depicted, mobile device 816 is in communication with antennas 812 and 814, where antennas 812 and 814 transmit information to mobile device 816 over a forward link 818 and receive information from mobile device 816 over a reverse link 820. Moreover, mobile device 822 is in communication with antennas 804 and 806, where antennas 804 and 806 transmit information to mobile device 822 over a forward link 824 and receive information from mobile device 822 over a reverse link 826. In a frequency division duplex (FDD) system, forward link 818 can utilize a different frequency band than that used by reverse link 820, and forward link 824 can employ a different frequency band than that employed by reverse link 826, for example. Further, in a time division duplex (TDD) system, forward link 818 and reverse link 820 can utilize a common frequency band and forward link 824 and reverse link 826 can utilize a common frequency band.

Each group of antennas and/or the area in which they are designated to communicate can be referred to as a sector of base station 802. For example, antenna groups can be designed to communicate to mobile devices in a sector of the areas covered by base station 802. In communication over forward links 818 and 824, the transmitting antennas of base station 802 can utilize beamforming to improve signal-to-noise ratio of forward links 818 and 824 for mobile devices 816 and 822. Also, while base station 802 utilizes beamforming to transmit to mobile devices 816 and 822 scattered randomly through an associated coverage, mobile devices in neighboring cells can be subject to less interference as compared to a base station transmitting through a single antenna to all its mobile devices. Moreover, mobile devices 816 and 822 can communicate directly with one another using a peer-to-peer or ad hoc technology as depicted.

Figure 9:
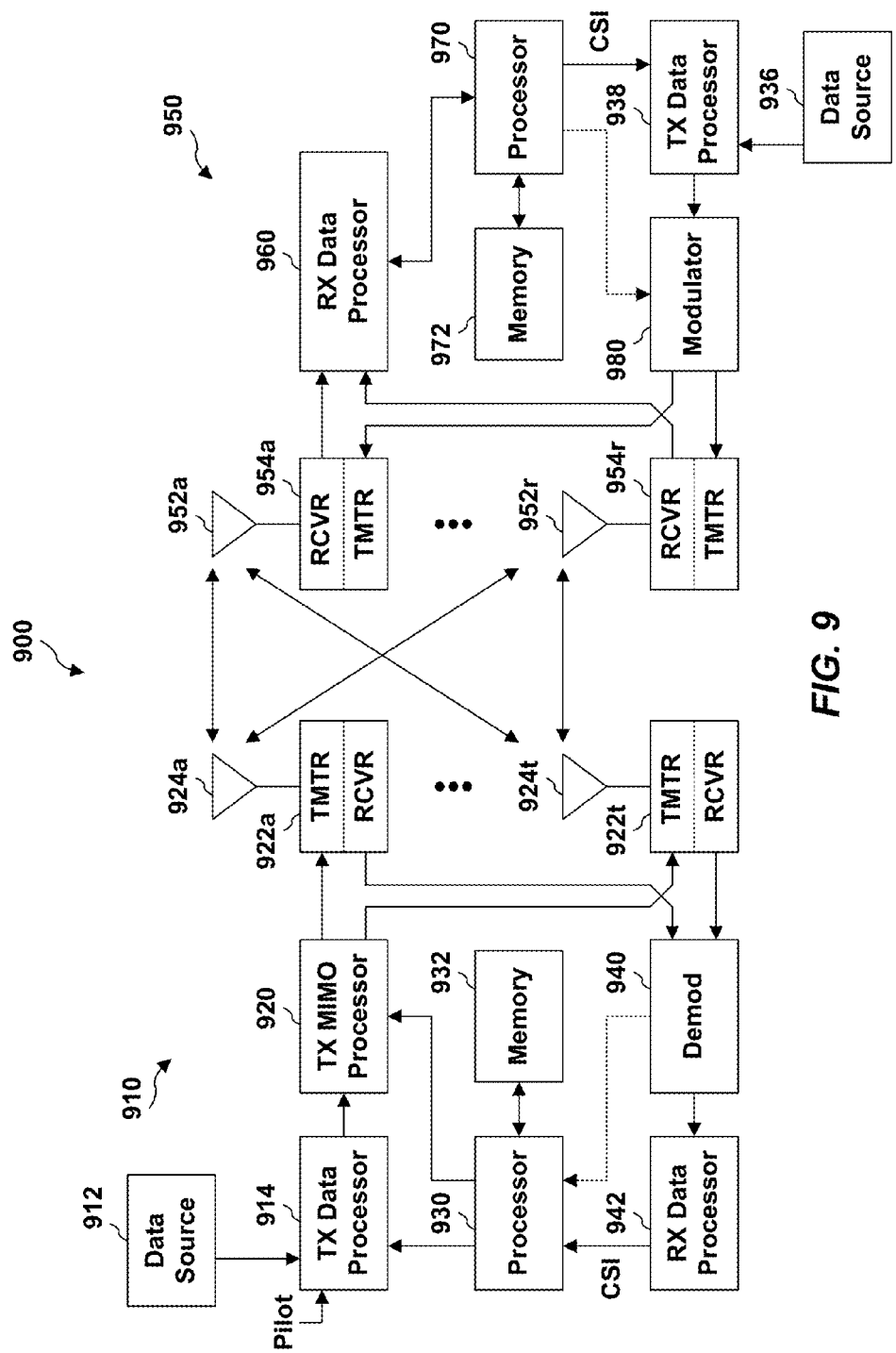
FIG. 9 is a schematic block diagram of an aspect of a wireless network environment that can be employed in conjunction with the various systems and methods described herein.

FIG. 9 shows an example wireless communication system 900. The wireless communication system 900 depicts one base station 910 and one mobile device 950 for sake of brevity. However, it is to be appreciated that system 900 can include more than one base station and/or more than one mobile device, wherein additional base stations and/or mobile devices can be substantially similar or different from example base station 910 and mobile device 950 described below. Moreover, base station 910 can be a low power base station, in one example, such as one or more femto nodes previously described. In addition, it is to be appreciated that base station 910 and/or mobile device 950 can employ the example systems (FIGS. 1-3 and 6-8) and/or methods (FIGS. 4-5) described herein to facilitate wireless communication there between. For example, components or functions of the systems and/or methods described herein can be part of a memory 932 and/or 972 or processors 930 and/or 970 described below, and/or can be executed by processors 930 and/or 970 to perform the disclosed functions.

At base station 910, traffic data for a number of data streams is provided from a data source 912 to a transmit (TX) data processor 914. According to an example, each data stream can be transmitted over a respective antenna. TX data processor 914 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 950 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 930.

The modulation symbols for the data streams can be provided to a TX MIMO processor 920, which can further process the modulation symbols (e.g., for OFDM). TX MIMO processor 920 then provides $N_T$ modulation symbol streams to $N_T$ transmitters (TMTR) 922a through 922t. In various embodiments, TX MIMO processor 920 applies beamforming weights to the symbols of the data streams and to the antenna from which the symbol is being transmitted.

Each transmitter 922 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 922a through 922t are transmitted from $N_T$ antennas 924a through 924t, respectively.

At mobile device 950, the transmitted modulated signals are received by $N_R$ antennas 952a through 952r and the received signal from each antenna 952 is provided to a respective receiver (RCVR) 954a through 954r. Each receiver 954 conditions (e.g., filters, amplifies, and downconverts) a respective signal, digitizes the conditioned signal to provide samples, and further processes the samples to provide a corresponding "received" symbol stream.

An RX data processor 960 can receive and process the $N_R$ received symbol streams from $N_R$ receivers 954 based on a particular receiver processing technique to provide $N_T$ "detected" symbol streams. RX data processor 960 can demodulate, deinterleave, and decode each detected symbol stream to recover the traffic data for the data stream. The processing by RX data processor 960 is complementary to that performed by TX MIMO processor 920 and TX data processor 914 at base station 910.

The reverse link message can comprise various types of information regarding the communication link and/or the received data stream. The reverse link message can be processed by a TX data processor 938, which also receives traffic data for a number of data streams from a data source 936, modulated by a modulator 980, conditioned by transmitters 954a through 954r, and transmitted back to base station 910.

At base station 910, the modulated signals from mobile device 950 are received by antennas 924, conditioned by receivers 922, demodulated by a demodulator 940, and processed by a RX data processor 942 to extract the reverse link message transmitted by mobile device 950. Further, processor 930 can process the extracted message to determine which precoding matrix to use for determining the beamforming weights.

Processors 930 and 970 can direct (e.g., control, coordinate, manage, etc.) operation at base station 910 and mobile device 950, respectively. Respective processors 930 and 970 can be associated with memory 932 and 972 that store program codes and data. For example, processor 930 and/or 970 can execute, and/or memory 932 and/or 972 can store instructions related to functions and/or components described herein, such as determining signal energy parameters, adjusting transmission parameters, and/or the like, as described.

Figure 10:
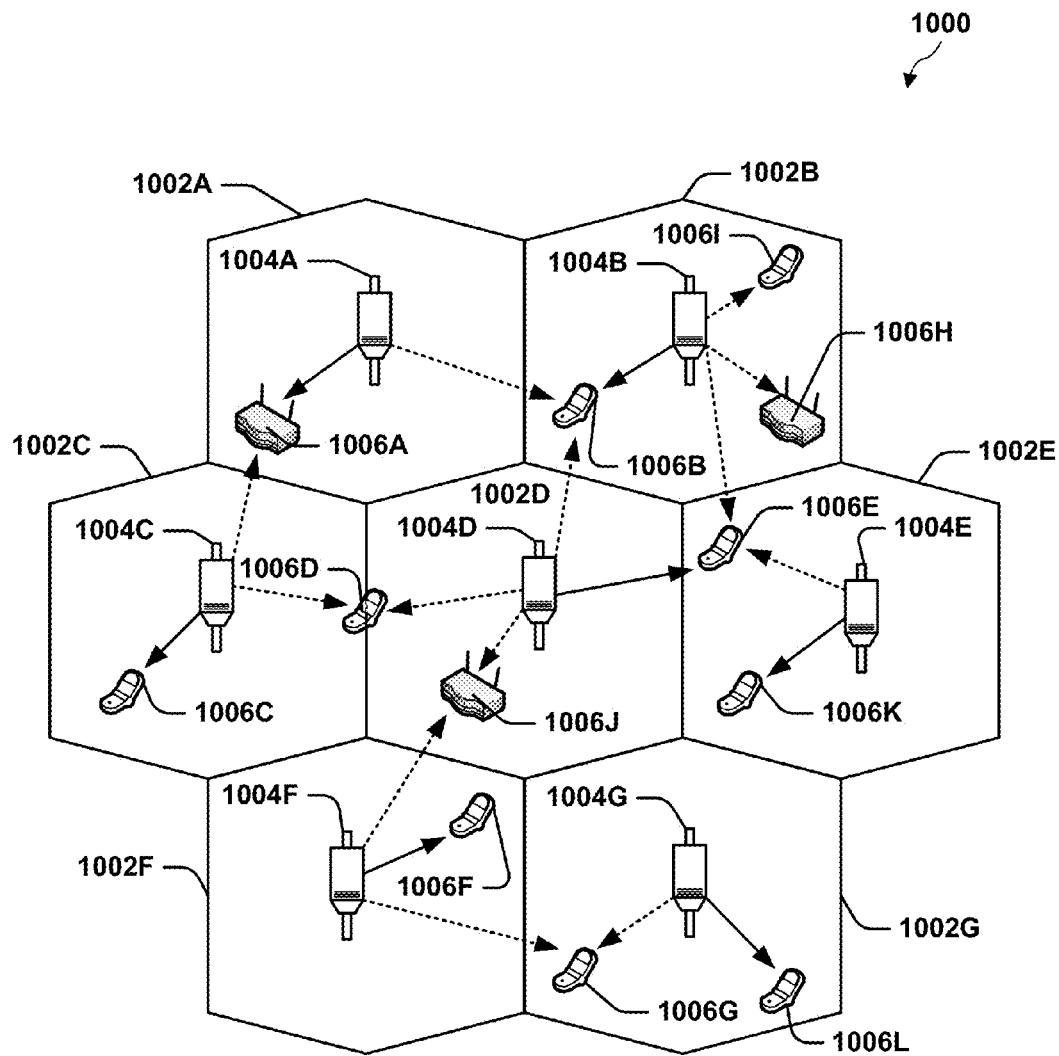
FIG. 10 illustrates an example wireless communication system, configured to support a number of devices, in which the aspects herein can be implemented.

FIG. 10 illustrates a wireless communication system 1000, configured to support a number of users, in which the teachings herein may be implemented. The system 1000 provides communication for multiple cells 1002, such as, for example, macro cells 1002A-1002G, with each cell being serviced by a corresponding access node 1004 (e.g., access nodes 1004A-1004G). As shown in FIG. 10, access terminals 1006 (e.g., access terminals 1006A-1006L) can be dispersed at various locations throughout the system over time. Each access terminal 1006 can communicate with one or more access nodes 1004 on a forward link (FL) and/or a reverse link (RL) at a given moment, depending upon whether the access terminal 1006 is active and whether it is in soft handoff, for example. The wireless communication system 1000 can provide service over a large geographic region.

Figure 11:
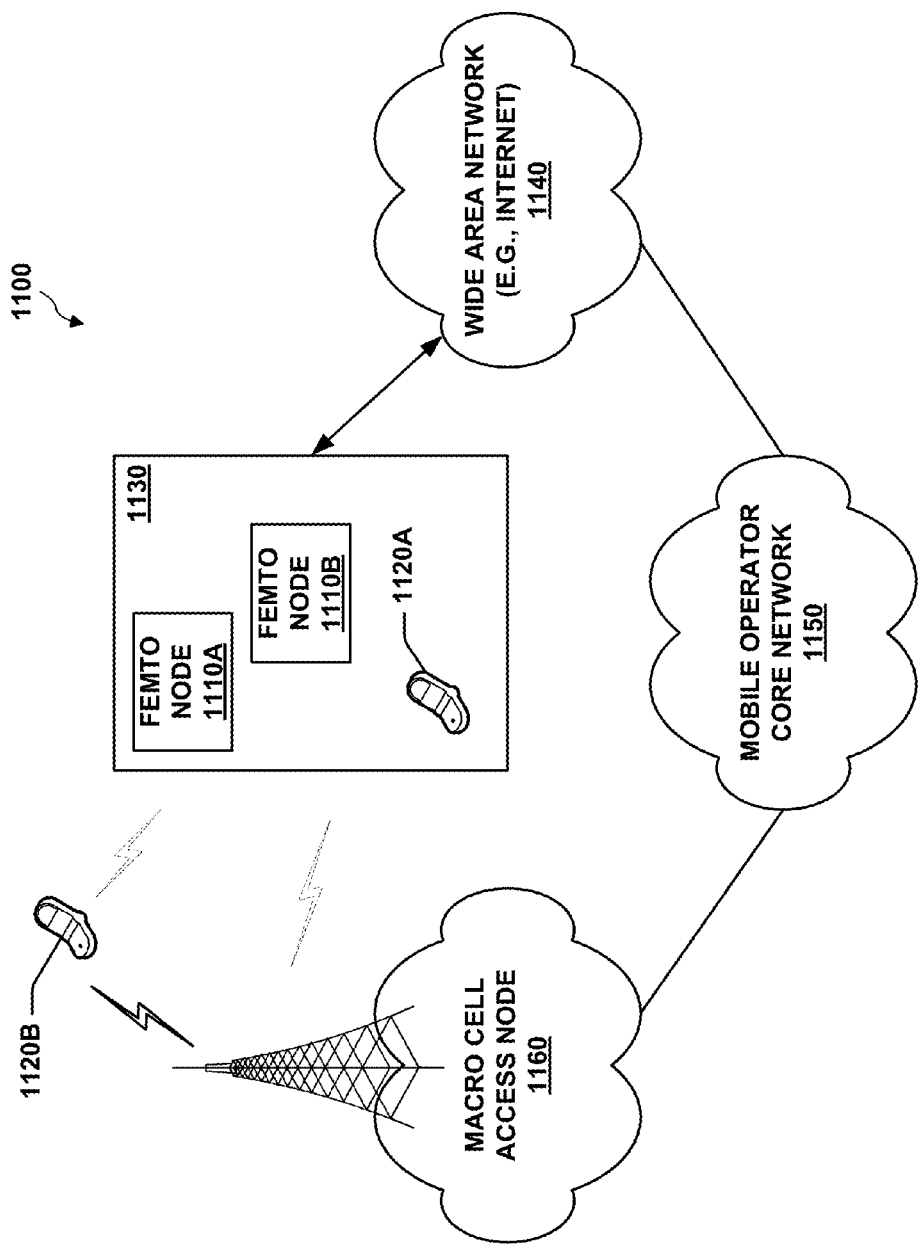
FIG. 11 is an illustration of an exemplary communication system to enable deployment of femtocells within a network environment.

FIG. 11 illustrates an exemplary communication system 1100 where one or more femto nodes are deployed within a network environment. Specifically, the system 1100 includes multiple femto nodes 1110A and 1110B (e.g., femtocell nodes or H(e)NB) installed in a relatively small scale network environment (e.g., in one or more user residences 1130). Each femto node 1110 can be coupled to a wide area network 1140 (e.g., the Internet) and a mobile operator core network 1150 via a digital subscriber line (DSL) router, a cable modem, a wireless link, or other connectivity means (not shown). As will be discussed below, each femto node 1110 can be configured to serve associated access terminals 1120 (e.g., access terminal 1120A) and, optionally, alien access terminals 1120 (e.g., access terminal 1120B). In other words, access to femto nodes 1110 can be restricted such that a given access terminal 1120 can be served by a set of designated (e.g., home) femto node(s) 1110 but may not be served by any non-designated femto nodes 1110 (e.g., a neighbor's femto node).

FIG. 12 illustrates an example of a coverage map 1200 where several tracking areas 1202 (or routing areas or location areas) are defined, each of which includes several macro coverage areas 1204. Here, areas of coverage associated with tracking areas 1202A, 1202B, and 1202C are delineated by the wide lines and the macro coverage areas 1204 are represented by the hexagons. The tracking areas 1202 also include femto coverage areas 1206. In this example, each of the femto coverage areas 1206 (e.g., femto coverage area 1206C) is depicted within a macro coverage area 1204 (e.g., macro coverage area 1204B). It should be appreciated, however, that a femto coverage area 1206 may not lie entirely within a macro coverage area 1204. In practice, a large number of femto coverage areas 1206 can be defined with a given tracking area 1202 or macro coverage area 1204. Also, one or more pico coverage areas (not shown) can be defined within a given tracking area 1202 or macro coverage area 1204.

Referring again to FIG. 11, the owner of a femto node 1110 can subscribe to mobile service, such as, for example, 3G mobile service, offered through the mobile operator core network 1150. In addition, an access terminal 1120 can be capable of operating both in macro environments and in smaller scale (e.g., residential) network environments. Thus, for example, depending on the current location of the access terminal 1120, the access terminal 1120 can be served by an access node 1160 or by any one of a set of femto nodes 1110 (e.g., the femto nodes 1110A and 1110B that reside within a corresponding user residence 1130). For example, when a subscriber is outside his home, he is served by a standard macro cell access node (e.g., node 1160) and when the subscriber is at home, he is served by a femto node (e.g., node 1110A). Here, it should be appreciated that a femto node 1110 can be backward compatible with existing access terminals 1120.

A femto node 1110 can be deployed on a single frequency or, in the alternative, on multiple frequencies. Depending on the particular configuration, the single frequency or one or more of the multiple frequencies can overlap with one or more frequencies used by a macro cell access node (e.g., node 1160). In some aspects, an access terminal 1120 can be configured to connect to a preferred femto node (e.g., the home femto node of the access terminal 1120) whenever such connectivity is possible. For example, whenever the access terminal 1120 is within the user's residence 1130, it can communicate with the home femto node 1110.

In some aspects, if the access terminal 1120 operates within the mobile operator core network 1150 but is not residing on its most preferred network (e.g., as defined in a preferred roaming list), the access terminal 1120 can continue to search for the most preferred network (e.g., femto node 1110) using a Better System Reselection (BSR), which can involve a periodic scanning of available systems to determine whether better systems are currently available, and subsequent efforts to associate with such preferred systems. Using an acquisition table entry (e.g., in a preferred roaming list), in one example, the access terminal 1120 can limit the search for specific band and channel. For example, the search for the most preferred system can be repeated periodically. Upon discovery of a preferred femto node, such as femto node 1110, the access terminal 1120 selects the femto node 1110 for camping within its coverage area.

A femto node can be restricted in some aspects. For example, a given femto node can only provide certain services to certain access terminals. In deployments with so-called restricted (or closed) association, a given access terminal can only be served by the macro cell mobile network and a defined set of femto nodes (e.g., the femto nodes 1110 that reside within the corresponding user residence 1130). In some implementations, a femto node can be restricted to not provide, for at least one access terminal, at least one of: signaling, data access, registration, paging, or service.

In some aspects, a restricted femto node (which can also be referred to as a Closed Subscriber Group H(e)NB) is one that provides service to a restricted provisioned set of access terminals. This set can be temporarily or permanently extended as necessary. In some aspects, a Closed Subscriber Group (CSG) can be defined as the set of access nodes (e.g., femto nodes) that share a common access control list of access terminals. A channel on which all femto nodes (or all restricted femto nodes) in a region operate can be referred to as a femto channel.

Various relationships can thus exist between a given femto node and a given access terminal. For example, from the perspective of an access terminal, an open femto node can refer to a femto node with no restricted association. A restricted femto node can refer to a femto node that is restricted in some manner (e.g., restricted for association and/or registration). A home femto node can refer to a femto node on which the access terminal is authorized to access and operate on. A guest femto node can refer to a femto node on which an access terminal is temporarily authorized to access or operate on. An alien femto node can refer to a femto node on which the access terminal is not authorized to access or operate on (e.g., the access terminal is a non-member), except for perhaps emergency situations (e.g., 911 calls).

From a restricted femto node perspective, a home access terminal can refer to an access terminal that authorized to access the restricted femto node. A guest access terminal can refer to an access terminal with temporary access to the restricted femto node. An alien access terminal can refer to an access terminal that does not have permission to access the restricted femto node, except for perhaps emergency situations, for example, 911 calls (e.g., an access terminal that does not have the credentials or permission to register with the restricted femto node).

For convenience, the disclosure herein describes various functionality in the context of a femto node. It should be appreciated, however, that a pico node can provide the same or similar functionality as a femto node, but for a larger coverage area. For example, a pico node can be restricted, a home pico node can be defined for a given access terminal, and so on.

A wireless multiple-access communication system can simultaneously support communication for multiple wireless access terminals. As mentioned above, each terminal can communicate with one or more base stations via transmissions on the forward and reverse links. The forward link (or downlink) refers to the communication link from the base stations to the terminals, and the reverse link (or uplink) refers to the communication link from the terminals to the base stations. This communication link can be established via a single-in-single-out system, a MIMO system, or some other type of system.

The various illustrative logics, logical blocks, modules, components, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal.

In one or more aspects, the functions, methods, or algorithms described may be implemented in hardware, software, firmware, or any combination thereof. If implemented in software, the functions may be stored or transmitted as one or more instructions or code on a computer-readable medium, which may be incorporated into a computer program product. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, substantially any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method for performing power control for a femto node deployed in a wireless network, comprising:
    measuring a received signal strength indicator (RSSI) at a femto node;
    determining a comparison between the RSSI, a noise floor, and a threshold RSSI; and
    adjusting a transmission parameter of the femto node based on the comparison,
    wherein the adjusting the transmission parameter comprises modifying a transmit power of the femto node as a function of the RSSI, the noise floor, and the threshold RSSI, where the comparison indicates the RSSI is above the noise floor and below the threshold RSSI.

2. The method of claim 1, wherein the adjusting the transmission parameter comprises setting the transmit power of the femto node to a maximum transmit power where the comparison indicates the RSSI is below the noise floor.

3. The method of claim 1, wherein the modifying the transmit power of the femto node is further based on a maximum transmit power and a minimum transmit power.

4. The method of claim 1, wherein the adjusting the transmission parameter comprises setting the transmit power of the femto node to zero or to a minimum transmit power where the comparison indicates the RSSI is above the threshold RSSI.

5. The method of claim 1, wherein the measuring comprises determining the RSSI of a downlink channel using a transceiver or a network listening module.

6. The method of claim 1, further comprising determining the threshold RSSI from at least one of a received configuration, a location of the femto node, a number of neighboring femto nodes, or a history of threshold RSSIs with corresponding performance metrics.

7. The method of claim 1, wherein the measuring the RSSI is performed based on a timer or an event detected by the femto node.

8. The method of claim 7, wherein the event is at least one of a detected change in RSSI at the femto node, a detected or indicated change in load at the femto node or one or more neighboring femto nodes, or a new neighboring femto node communicating in the wireless network.

9. The method of claim 1, wherein the adjusting the transmission parameter comprises adjusting a modulation and coding scheme, a frequency/time resource utilization, an access mode, an antenna selection, or an antenna pattern selection.

10. An apparatus for performing power control for a femto node deployed in a wireless network, comprising:
    at least one processor configured to:
        measure a received signal strength indicator (RSSI) at a femto node;
        determine a comparison between the RSSI, a noise floor, and a threshold RSSI; and
        adjust a transmission parameter of the femto node based on the comparison; and
    a memory coupled to the at least one processor,
    wherein the at least one processor adjusts the transmission parameter by modifying a transmit power of the femto node as a function of the RSSI, the noise floor, and the threshold RSSI where the comparison indicates the RSSI above the noise floor and below the threshold RSSI.

11. The apparatus of claim 10, wherein the at least one processor adjusts the transmission parameter by setting the transmit power of the femto node to a maximum transmit power where the comparison indicates the RSSI below the noise floor.

12. The apparatus of claim 10, wherein the at least one processor further modifies the transmit power of the femto node based on a maximum transmit power and a minimum transmit power.

13. The apparatus of claim 10, wherein the at least one processor adjusts the transmission parameter by setting the transmit power of the femto node to zero or to a minimum transmit power where the comparison indicates the RSSI above the threshold RSSI.

14. The apparatus of claim 10, wherein the at least one processor measures the RSSI using a transceiver or a network listening module.

15. The apparatus of claim 10, wherein the at least one processor is further configured to determine the threshold RSSI from a received configuration, a location of the femto node, a number of neighboring femto nodes, or a history of threshold RSSIs with corresponding performance metrics.

16. The apparatus of claim 10, wherein the at least one processor measures the RSSI based on a timer or an event detected by the femto node.

17. The apparatus of claim 16, wherein the event is at least one of a detected change in RSSI at the femto node, a detected or indicated change in load at the femto node or one or more neighboring femto nodes, or a new neighboring femto node communicating in the wireless network.

18. An apparatus for performing power control for a femto node deployed in a wireless network, comprising:
    means for determining a comparison between a received signal strength indicator (RSSI) measured at a femto node, a noise floor, and a threshold RSSI; and
    means for adjusting a transmission parameter of the femto node based on the comparison,
    wherein the means for adjusting modifies a transmit power of the femto node as a function of the RSSI, the noise floor, and the threshold RSSI where the comparison indicates the RSSI above the noise floor and below the threshold RSSI.

19. The apparatus of claim 18, wherein the means for adjusting sets the transmit power of the femto node to a maximum transmit power where the comparison indicates the RSSI below the noise floor.

20. The apparatus of claim 18, wherein the means for adjusting modifies the transmit power of the femto node further based on a maximum transmit power and a minimum transmit power.

21. The apparatus of claim 18, wherein the means for adjusting sets the transmit power of the femto node to zero or to a minimum transmit power where the comparison indicates the RSSI above the threshold RSSI.

22. The apparatus of claim 18, wherein the means for determining comprises means for determining the RSSI of a downlink channel.

23. The apparatus of claim 18, wherein the means for adjusting determines the threshold RSSI from a received configuration, a location of the femto node, a number of neighboring femto nodes, or a history of threshold RSSIs with corresponding performance metrics.

24. The apparatus of claim 18, wherein the means for determining measures the RSSI based on a timer or an event detected by the femto node.

25. The apparatus of claim 24, wherein the event is at least one of a detected change in RSSI at the femto node, a detected or indicated change in load at the femto node or one or more neighboring femto nodes, or a new neighboring femto node communicating in the wireless network.

26. A non-transitory computer-readable medium for performing power control for a femto node deployed in a wireless network, comprising:
   code for measuring a received signal strength indicator (RSSI) at a femto node;
   code for determining a comparison between the RSSI, a noise floor, and a threshold RSSI; and
   code for adjusting a transmission parameter of the femto node based on the comparison,
   wherein the code for adjusting adjusts the transmission parameter by modifying a transmit power of the femto node as a function of the RSSI, the noise floor, and the threshold RSSI where the comparison indicates the RSSI above the noise floor and below the threshold RSSI.

27. The computer-readable medium of claim 26, wherein the code for adjusting adjusts the transmission parameter by setting the transmit power of the femto node to a maximum transmit power where the comparison indicates the RSSI below the noise floor.

28. The computer-readable medium of claim 26, wherein the code for adjusting modifies the transmit power of the femto node based on a maximum transmit power and a minimum transmit power.

29. The computer-readable medium of claim 26, wherein the code for adjusting adjusts the transmission parameter by setting the transmit power of the femto node to zero or to a minimum transmit power where the comparison indicates the RSSI above the threshold RSSI.

30. The computer-readable medium of claim 26, wherein the code for measuring measures the RSSI using a transceiver or a network listening module.

31. The computer-readable medium of claim 26, further comprising code for determining the threshold RSSI from a received configuration, a location of the femto node, a number of neighboring femto nodes, or a history of threshold RSSIs with corresponding performance metrics.

32. The computer-readable medium of claim 26, wherein the code for measuring measures the RSSI based on a timer or an event detected by the femto node.

33. The computer-readable medium of claim 32, wherein the event is at least one of a detected change in RSSI at the femto node, a detected or indicated change in load at the femto node or one or more neighboring femto nodes, or a new neighboring femto node communicating in the wireless network.

34. An apparatus for performing power control for a femto node deployed in a wireless network, comprising:
   a signal energy measuring component for determining a comparison between a received signal strength indicator (RSSI) measured at a femto node, a noise floor, and a threshold RSSI; and
   a transmission adjusting component for adjusting a transmission parameter of the femto node based on the comparison,
   wherein the transmission adjusting component modifies a transmit power of the femto node as a function of the RSSI, the noise floor, and the threshold RSSI where the comparison indicates the RSSI above the noise floor and below the threshold RSSI.

35. The apparatus of claim 34, wherein the transmission adjusting component sets the transmit power of the femto node to a maximum transmit power where the comparison indicates the RSSI below the noise floor.

36. The apparatus of claim 34, wherein the transmission adjusting component modifies the transmit power of the femto node further based on a maximum transmit power and a minimum transmit power.

37. The apparatus of claim 34, wherein the transmission adjusting component sets the transmit power of the femto node to zero or to a minimum transmit power where the comparison indicates the RSSI above the threshold RSSI.

38. The apparatus of claim 34, wherein the signal energy measuring component comprises a transceiver or a network listening module component for determining the RSSI of a downlink channel.

39. The apparatus of claim 34, wherein the transmission adjusting component determines the threshold RSSI from a received configuration, a location of the femto node, a number of neighboring femto nodes, or a history of threshold RSSIs with corresponding performance metrics.

40. The apparatus of claim 34, wherein the signal energy measuring component measures the RSSI based on a timer or an event detected by the femto node.

41. The apparatus of claim 40, wherein the event is at least one of a detected change in RSSI at the femto node, a detected or indicated change in load at the femto node or one or more neighboring femto nodes, or a new neighboring femto node communicating in the wireless network.

42. The apparatus of claim 34, wherein the transmission adjusting component adjusts a modulation and coding scheme, a frequency/time resource utilization, an access mode, an antenna selection, or an antenna pattern selection.

* * * * *